US010259705B2

(12) United States Patent
Langan et al.

(10) Patent No.: US 10,259,705 B2
(45) Date of Patent: Apr. 16, 2019

(54) FUEL UNIT, REFILLABLE HYDROGEN GENERATOR AND FUEL CELL SYSTEM

(71) Applicant: Intelligent Energy Inc., San Jose, CA (US)

(72) Inventors: Richard A. Langan, Parma, OH (US); Chad E. Law, Milan, OH (US); Jason L. Stimits, Avon, OH (US); Mark D. Vandayburg, Westlake, OH (US); Gerald A. Zsigo, North Ridgeville, OH (US); Thomas J. Kmetich, Willoughby Hills, OH (US); Craig R. Huddleston, Lakewood, OH (US); Paul D. Griffith, Jr., North Olmsted, OH (US); Andrew Jasin, Avon, OH (US)

(73) Assignee: Intelligent Energy Inc., San Jose, CA (US)

( * ) Notice: Subject to any disclaimer, the term of this patent is extended or adjusted under 35 U.S.C. 154(b) by 21 days.

(21) Appl. No.: 15/045,916

(22) Filed: Feb. 17, 2016

(65) Prior Publication Data

US 2016/0159647 A1    Jun. 9, 2016

Related U.S. Application Data

(63) Continuation of application No. 13/943,945, filed on Jul. 17, 2013, now Pat. No. 9,295,958.

(Continued)

(51) Int. Cl.
*C01B 3/04* (2006.01)
*B01J 7/00* (2006.01)

(52) U.S. Cl.
CPC ............... *C01B 3/04* (2013.01); *B01J 7/00* (2013.01); *Y02E 60/364* (2013.01)

(58) Field of Classification Search
CPC combination set(s) only.
See application file for complete search history.

(56) References Cited

U.S. PATENT DOCUMENTS 5,212,343 A * 5/1993 Brupbacher ............ C06B 33/00
102/302
9,056,768 B2    6/2015 Langan
(Continued)

FOREIGN PATENT DOCUMENTS

FR    2957911 A1    9/2011
JP    2008-254967 A    10/2008
(Continued)

OTHER PUBLICATIONS

U.S. Appl. No. 61/657,909, filed Jun. 11, 2012, Kmetich et al.

*Primary Examiner* — Kaity V Chandler
(74) *Attorney, Agent, or Firm* — BakerHostetler

(57) ABSTRACT

A packaged fuel unit and a refillable hydrogen generator that uses the fuel unit to produce hydrogen gas are disclosed. The fuel unit includes a reactant that can undergo a thermal decomposition reaction that produces hydrogen gas when heated to at least a minimum initiation temperature. The reactant is contained within a package that includes a poor thermal conductor with one or more thermal conductor sections for conducting heat from outside the package to the reactant. The hydrogen generator includes a holder with a cavity in which the fuel unit can be removably disposed and a heating system for heating the fuel unit when disposed therein. The hydrogen generator can be part of a fuel cell system including a fuel cell battery that is provided with hydrogen gas from the hydrogen generator.

12 Claims, 2 Drawing Sheets

Related U.S. Application Data

(60) Provisional application No. 61/681,160, filed on Aug. 9, 2012.

(56) References Cited

U.S. PATENT DOCUMENTS

| | | | |
|---|---|---|---|
| 2003/0214064 A1* | 11/2003 | Shin et al. | |
| 2004/0131904 A1 | 7/2004 | Arthur et al. | |
| 2005/0142404 A1 | 6/2005 | Boucher et al. | |
| 2007/0151452 A1* | 7/2007 | Giacobbe | B01D 53/04 95/143 |
| 2009/0017348 A1 | 1/2009 | Kelly et al. | |
| 2010/0247425 A1 | 9/2010 | Scattergood et al. | |
| 2012/0323059 A1* | 12/2012 | Liu | C07C 7/144 585/818 |
| 2013/0043125 A1* | 2/2013 | Gill | C25B 1/04 204/267 |

FOREIGN PATENT DOCUMENTS

| | | |
|---|---|---|
| JP | 2009-086541 A | 7/2009 |
| JP | WO 2009/116593 A1 * | 9/2009 |
| JP | 2011-140420 A | 7/2011 |
| WO | WO 2008/118437 A2 | 10/2008 |
| WO | WO 2013/188260 A2 | 12/2013 |

* cited by examiner

FUEL UNIT, REFILLABLE HYDROGEN GENERATOR AND FUEL CELL SYSTEM

CROSS-REFERENCE TO RELATED APPLICATIONS

This application is a Continuation of U.S. patent application Ser. No. 13/943,945 filed Jul. 17, 2013, which claims the benefit of U.S. Provisional Application No. 61/681,160, filed Aug. 9, 2012, the entirety of which are hereby incorporated by reference as if fully set forth herein.

TECHNICAL FIELD

This invention relates to a fuel unit containing a reactant that can produce hydrogen gas, hydrogen generator for providing hydrogen gas by heating a fuel unit, and a fuel cell system including the hydrogen generator and a hydrogen fuel cell that can be provided with hydrogen gas by the hydrogen generator.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell can use hydrogen and oxygen as the active materials of the fuel cell negative electrode (anode) and positive electrode (cathode), respectively. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogencontaining fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (e.g., a fuel cell stack), and a fuel source, such as a fuel tank or a hydrogen generator.

Hydrogen generators that supply hydrogen gas to a fuel cell can be an integral part of a fuel cell system, or they can be removably coupled to the fuel cell system. A removable hydrogen generator can be replaced with another one when the hydrogen producing reactants have been consumed. Removable hydrogen generators can be disposable (intended for only a one-time use). Both removable and permanently installed hydrogen generators can be refillable (intended for use multiple times) to replace consumed reactant materials.

Hydrogen generators can produce hydrogen using a variety of reactants and a variety of methods for initiating the hydrogen generating reactants. Hydrogen gas can be evolved when a hydrogen containing material reacts. Some hydrogen containing compounds can react with another reactant to produce hydrogen gas, when the reactants are mixed together, in the presence of a catalyst, heat or an acid, or a combination thereof. Some hydrogen containing compounds can be heated to evolve hydrogen in a thermochemical decomposition reaction.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

An object of the present invention is to provide a packaged fuel unit containing a reactant that can produce hydrogen gas when heated. The packaged fuel unit desirably has one or more of the following characteristics: contains a maximum quantity of reactant to produce a maximum quantity of hydrogen gas and a minimum volume of packaging or other components; has a simple design and is easy and inexpensive to manufacture; reliably contains its contents before and after use; provides good heat transfer to the reactant therein; and has a package that facilitates selective heating of individual segregated quantities of reactant to provide hydrogen on an as-needed basis.

Another object of the invention is to provide a hydrogen generator using the fuel units to produce hydrogen gas safely and economically. The hydrogen generator desirably has one or more of the following characteristics: fuel units can be easily and safely replaced as the reactant therein is consumed; includes a holder containing a maximum number of expensive and reusable components; includes a heating system can be controlled to heat the reactant and provide hydrogen on an as-needed basis.

Yet another object of the invention is to provide a fuel cell system including a fuel cell battery and a hydrogen generator that can be safely, easily and economically operated.

SUMMARY

In one aspect of the invention, there is provided a packaged fuel unit that contains a plurality of segregated quantities of fuel, each including a reactant that can undergo a thermal decomposition reaction that produces hydrogen gas when heated to at least a minimum initiation temperature. The fuel is contained within a package that includes a container covered by a lid. The container is made from a material with a poor thermal conductivity of less than 5 watts/meter·Kelvin, and the lid includes a material with a poor thermal conductivity less than 5 watts/meter·Kelvin having a plurality of apertures therein, wherein each aperture is covered by a thermal conductor section, and each thermal conductor section is in contact with at least one of the plurality of segregated quantities of fuel.

Embodiments can include one or more of the following features:

the container includes a plurality of compartments, each containing at least one of the plurality of segregated quantities of fuel;

each of the apertures is covered by one of the plurality of thermal conductor sections;

the package includes a laminate material with a poor thermal conductor layer and a discontinuous thermal conductor layer including the plurality of thermal conductor sections;

each of the thermal conductor sections is bonded to the poor thermal conductivity material of the lid; each of the thermal conductor sections can have a peripheral area bonded to the poor thermal conductivity material of the lid; the bond can be continuous; the bond can be discontinuous to provide a gas passage through the package; each bond can be of a type selected from adhesive bonds, ultrasonic bonds and heat bonds.

the lid is secured to the container with one or a combination of an adhesive bond, and ultrasonic bond, and a heat bond;

the poor thermal conductivity material of at least one of the container and the lid is made from a flexible glass or at least one high temperature polymer having a heat distortion temperature (deflection temperature under load) (as determined according to ASTM D648 at 18.56 kg/cm2 (264 psi)) greater than 250° C.;

the poor thermal conductivity material of at least one of the container and the lid is made from a high temperature polymer selected from polyetheretherketone, a polyimide, a phenolic and a derivative thereof; the poor thermal conductor can be made from polyetheretherketone;

the poor thermal conductivity material of at least one of the container and the lid is in the form of a flexible sheet; the sheet can have an average thickness from about 0.05 mm or greater to about 0.25 mm or less; the sheet can have an average thickness of about 0.10 mm or greater; the sheet can have an average thickness of about 0.15 mm or less;

each thermal conductor section has a thermal conductivity greater than 100 watts/meter·Kelvin;

each thermal conductor section is made from a graphite based material or a metal; each thermal conductor section can be made from a metal selected from aluminum, steel, stainless steel, copper, a combination or alloy thereof; each thermal conductor section can be made from aluminum or an aluminum alloy; each thermal conductor section can be in the form of a flexible sheet; the sheet can have an average thickness from about 0.025 mm or greater to about 0.25 mm or less; the sheet can have an average thickness of about 0.10 mm or less;

the package includes a gas outlet; a filter can be disposed across the gas outlet to contain solids and allow gas to flow therethrough; the filter can be made from a material selected from silica, silicon dioxide, a silicon nitride, a silicon carbide, a silica aerogel, alumina, aluminum oxide, glass, glass wool, mineral wool, a cellular glass, a microfiberglass, perlite, and a polymer (e.g., polytetrafluoroethylenes, polyimides, polyetheretherketone and epoxy-amine composites), a gas-permeable membrane, and a combination thereof; the filter can be made from a microfiberglass with a fiber diameter less than 6 μm; the filter can be secured to the package with an adhesive;

the fuel unit includes thermal insulation; the thermal insulation can be disposed between adjacent segregated quantities of fuel; the thermal insulation can include a porous material through which hydrogen gas can pass; the porous thermal insulation can filter the hydrogen gas passing therethrough; the porous thermal insulation can include a paper material; the thermal insulation can include external thermal insulation disposed on one or more external surfaces of the package; the thermal insulation can include internal thermal insulation disposed within the package; the internal thermal insulation can be disposed adjacent to the package; the internal thermal insulation can be disposed between segregated quantities of the reactant; the thermal insulation can include a material selected from silica, silicon dioxide, silicon nitrides, silicon carbide, silica aerogel, alumina, aluminum oxide, glass, glass wool, mineral wool, cellular glass, perlite, polymers and paper;

the reactant is sufficiently exothermic for each segregated quantity of the fuel to undergo a self-sustaining hydrogen generating reaction after being heated to at least the minimum initiation temperature;

the reactant is not sufficiently exothermic for each segregated quantity of the fuel to undergo a self-sustaining hydrogen generating reaction after being heated to at least the minimum initiation temperature; each segregated quantity of fuel is in contact with an ignition material that will undergo a self-sustaining reaction after being heated to initiate reaction of the ignition material, thereby providing heat to sustain the hydrogen generating reaction in the segregated quantity of fuel until the reactant is substantially consumed;

the reactant includes one or a combination of lithium imide (LhNH), lithium amide (LiNH2), an ammonium halide (e.g., NH4F, NH4Cl or N2H6Ch) plus a chemical hydride (e.g., LiH, LiBH4, NaBH4, LiAlH4 or NaAlH4), alane (AlH3), ammonia borane (NH3BH3), ammonia borane plus a chemical hydride (e.g., alane or a boron hydrazine complex such as hydrazine bisborane (N2H4(BH3)2)), ammonium nitrate (NH4N03) plus diammonium decaborane (B10H10(NH4)2), and other materials (e.g., graphene, carbon nanotubes) with hydrogen inserted therein; the reactant can be included in a reactant composition; the reactant composition can include one or more of a binder, a stabilizing compound, a thermally conductive material, an ignition material, a molding release agent, and a coating;

the fuel unit includes an authentication feature; the authentication feature can provide fuel unit identification information; the fuel unit identification information can include one or a combination of a manufacturer, a manufacture date, a model number, a reactant type and a nominal hydrogen gas capacity; the authentication feature can be part of an authentication system; a portion of the authentication system can be disposed outside the packaged fuel unit; and the fuel unit includes a fuel gauging feature for determining one or a combination of hydrogen gas produced, hydrogen gas remaining, reactant consumed, reactant remaining, number of segregated quantities of fuel used, number of segregated quantities of fuel remaining; the fuel gauging feature can include one or more of a temperature sensor, a temperature indicator, and a memory device; the fuel gauging feature can be part of a fuel gauging system; a portion of the fuel gauging system can be disposed outside the package fuel unit.

In another aspect of the invention, there is provided a hydrogen generator that includes a holder having a cavity therein, a packaged fuel unit replaceably contained within the cavity, and a heating system including a plurality of heaters. The packaged fuel unit includes a plurality of segregated quantities of fuel, each including a reactant that can undergo a thermal decomposition reaction that produces hydrogen gas when heated to at least a minimum initiation temperature. The packaged fuel unit also includes a package including a container in which the plurality of segregated quantities of fuel is disposed, wherein the container is made from a material with a poor thermal conductivity of less than 5 watts/meter·Kelvin and is covered by a lid. The lid includes a material with a poor thermal conductivity of less than 5 watts/meter·Kelvin and a plurality of apertures therethrough, wherein each aperture is covered by a thermal conductor section, and each thermal conductor section is in contact with at least one of the plurality of segregated quantities of fuel. The package further includes at least one hydrogen outlet through which the hydrogen gas can escape. Embodiments can include one or more of the following features:

the holder includes a housing with a closeable door to retain the fuel unit in the cavity; the door can be sealable to contain hydrogen gas; the door can be removable; the housing can include a thermal insulator; the housing can be made from a material with poor thermal conductivity; the housing can have a thermal conductivity less than 10 watts/meter·Kelvin, preferably less than 1 watt/meter·Kelvin, and more preferably less than 0.1 watts/meter·Kelvin; the housing can include a material selected from a metal, a ceramic and a high temperature polymer; the high temperature polymer can be selected from polyphenylene sulfide, acrylonitrile butadiene styrene, polyetheretherketone, polyetherimide, polyoxybenzylmethylenglycol anhydride (Bakelite®), an epoxy, a phenolic, diallyl phthalate and melamine; the housing can include a partial vacuum between inner and outer housing walls;

the hydrogen outlet includes a valve to allow hydrogen gas out of the holder and to prevent gas from entering the holder; the valve can control the release of hydrogen gas from the holder;

the holder includes a filter through which hydrogen gas can pass; the filter can be made from a material selected from silica, silicon dioxide, a silicon nitride, a silicon carbide, a silica aerogel, alumina, aluminum oxide, glass, glass wool, mineral wool, a cellular glass, a microfiberglass, perlite, and a polymer (e.g., polytetrafluoroethylenes, polyimides and epoxy-amine composites), a gas-permeable membrane, and a combination thereof; the filter can be made from a microfiberglass with a fiber diameter less than 6 μm;

the holder includes an interlock to prevent removal of a fuel unit with a temperature above a predetermined maximum temperature; the predetermined maximum temperature can be 50° C. or lower;

the heaters include resistive heating elements;

individual heaters can be selectively controlled to selectively heat individual segregated quantities of fuel; the heaters can be disposed on an internal surface of a housing wall; the heaters can be disposed on a member projecting inward from the housing; the inward projecting member can project from a housing external wall; the inward projecting member can project from the door;

the heating system is provided with energy by an electric energy source; the electric energy source can be disposed outside the holder housing; the electric energy source can include one or more of a primary battery, a secondary battery, a fuel cell battery, a capacitor and a public utility;

the heating system is controlled by a control system; the control system can determine the need for hydrogen and/or the required hydrogen flow rate by monitoring the pressure within the a cell system, one or more electrical characteristics of a fuel cell battery, or one or more electrical characteristics of an electronic device; the control system can include one or more microprocessors, microcontrollers, circuits, switching devices; capacitors, sensing instruments, timers, DC-DC converters and combinations thereof; a portion of the control system can be disposed outside the holder housing;

the holder includes multiple chambers, each capable of removably containing one or more fuel units that can be independently controlled; the hydrogen generator can be capable of continuous operation while simultaneously allowing replacement of used fuel units after the used fuel units have cooled to or below a predetermined maximum temperature; the holder can include a separate door for accessing each chamber independently; and • the hydrogen generator is portable such that it can be carried by an individual user without the aid of tools or equipment • the packaged fuel unit can include any of the packaged fuel unit embodiments disclosed above.

In yet another aspect of the invention, there is provided a fuel cell system including a fuel cell battery and a hydrogen generator as described above. Embodiments can include one or more of the following features:

the fuel cell system is portable such that it can be carried by an individual user without the aid of tools or equipment;

the hydrogen generator is an integral part of the fuel cell system and is not removable from the fuel cell system without the use of a tool; and • the hydrogen generator is a removable component of the fuel cell system that is removable without the use of a tool.

DETAILED DESCRIPTION

Figure 1:
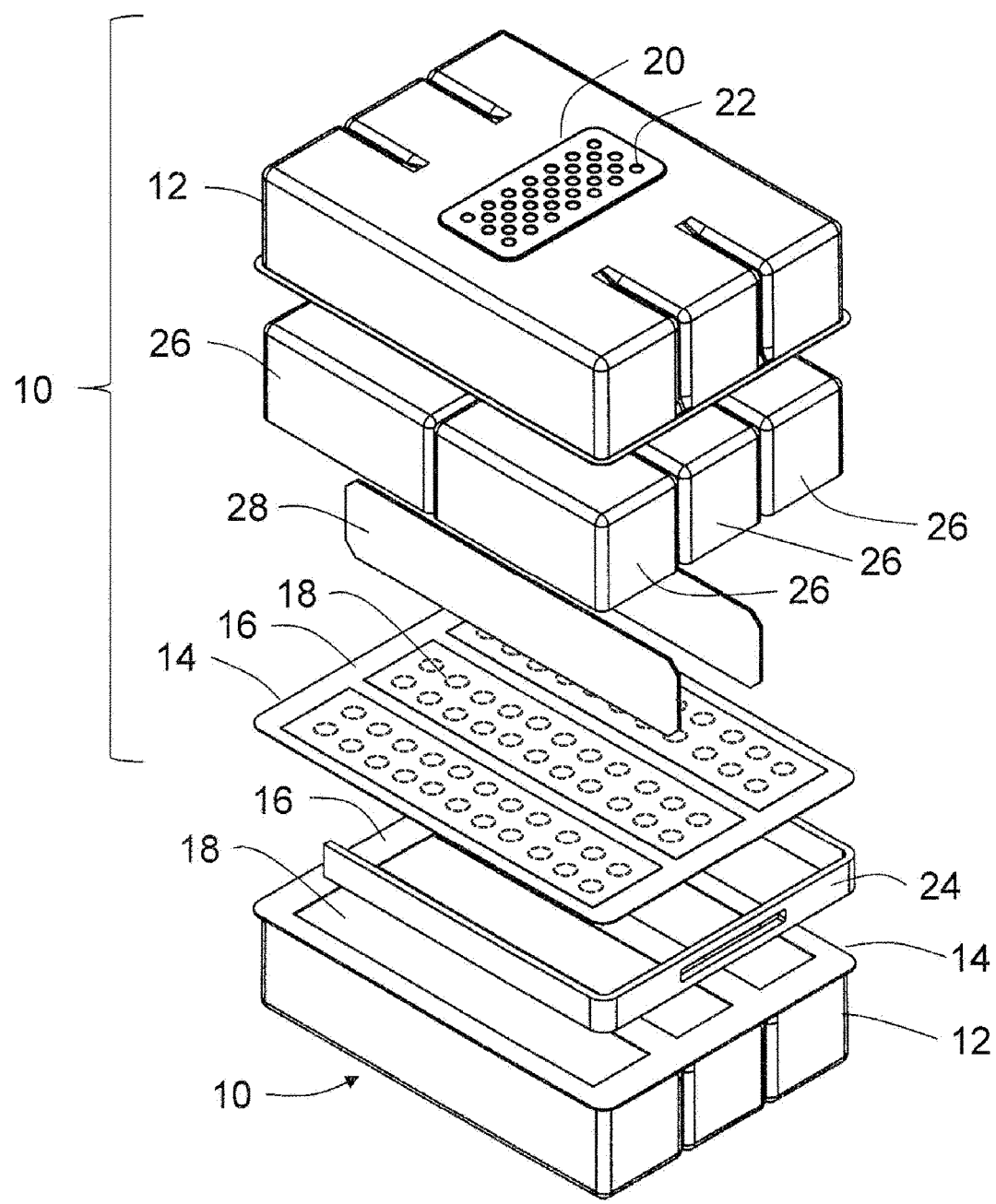
FIG. 1 is a partially exploded perspective view of an embodiment of two packaged fuel units.

The above objects are accomplished by the present invention, which is directed to a packaged fuel unit, a hydrogen generator that uses the fuel unit, and a fuel cell system including the hydrogen generator and a fuel cell battery (which may be referred to below as a fuel cell, whether it contains one or a plurality of fuel cells or fuel cell batteries). The hydrogen generator is a hydrogen gas generating apparatus that produces hydrogen gas. The hydrogen gas can be used as an active material for one of the electrodes of the fuel cell to produce electricity. Preferably the fuel unit is portable, either as a separate component or as part of a hydrogen generator. The hydrogen generator may be a either separate component or an integral part of the fuel cell system, which in turn can be either a separate article or an integral part of an electronic device that can be provided with electric energy by the fuel cell system. As used herein, a portable item is one that can be carried by an individual person, without requiring the use of lifting or transporting equipment (e.g., a hoist, dolly, lift truck or the like).

The hydrogen generator uses one or more reactants that can react to produce hydrogen gas. In order to economically produce a large volume of hydrogen gas per unit of volume and weight, it is advantageous to use a reactant that can undergo a thermal decomposition reaction that produces hydrogen gas when heated. Such thermal decomposition reactions can produce a larger volume of gas of reactant than, for example, the same amount (per mole, per unit of weight or per unit of volume) of reactants that undergo a hydrolysis reaction.

In order to provide an economical hydrogen generator and fuel cell system, it is desirable to be able to replace reaction byproducts with fresh reactants, rather than replacing the entire hydrogen generator. This allows durable components of the hydrogen generator to be used many times. To maximize this effect, it is desirable to incorporate as many reusable components as practical into the reusable portion of the hydrogen generator (referred to below as the holder), and to limit the number of components in the replaceable portion of the hydrogen generator (referred to below as the fuel unit) to the greatest extent practical. This is particularly true for items that occupy a relatively large volume and/or are relatively expensive. Ideally, fuel units would contain only the hydrogen generating reactants.

However, for practical reasons it may also be desirable to include other ingredients and components in the fuel units.

The hydrogen generator includes a holder that is configured to receive one or more fuel units. The holder can include a housing with sufficient mechanical strength and resistance to the environment to which the hydrogen generator is expected to be exposed, particularly to high temperatures and reactants and byproducts associated with the hydrogen generating reactions. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethylenglycol anhydride (Bakelite®), epoxies, phenolics, diallyl phthalate and melamine may be suitable for the housing. In some embodiments the housing may be made from a material that is a poor thermal conductor (e.g., less than 10 watts/meter·Kelvin), preferably less than 1 watt/meter·Kelvin, and more preferably less than 0.1 watt/meter·Kelvin) to protect the rest of the fuel cell system, the device and/or the user from heat produced within the hydrogen generator. If desired, thermal insulation can be added to the hydrogen generator, within the housing, around the housing or elsewhere in the fuel cell system or the device. A vacuum, such as in a hollow space in a wall(s) of the holder, can provide thermal insulation. Thermal insulation can protect components of the hydrogen generator, other parts of the fuel cell system, the device with which the fuel cell system is being used, and/or the user. In some circumstances, it may be desirable to locate at least some portions of those other components outside the holder housing, such as elsewhere within the fuel cell system and/or a device that can be powered by the fuel cell system. In some embodiments the housing can include portions of the fuel cell system.

The holder includes one or more cavities into which fuel units can be removably inserted. The cavity can include features for aligning the packaged fuel unit in a particular orientation, providing thermal and/or electrical contact with the fuel unit, and/or providing a hydrogen gas flow path between the holder and the fuel unit. For example, the cavity can include one or more projections, recesses or shaped surfaces that cooperate with features of the fuel unit to permit insertion of a fuel unit into the cavity in only the desired orientation.

The holder can be closable to retain the fuel unit within the cavity, and it may be sealable to exclude gases from the outside environment and to pressurized hydrogen gas when not being supplied to a fuel cell. One or more doors can be used removably close or seal the fuel unit(s) in the holder. It may be desirable to include a pressure relief vent in the housing to release gas before the pressure gets too high (e.g., to prevent undesired opening or bursting of the housing).

The holder can include an outlet that interfaces with the rest of the fuel cell system. The holder can also include various fittings, valves and electrical connections for providing hydrogen to the fuel cell battery, providing power to the hydrogen generator from an external source, and interfacing with the fuel cell battery and/or an electrical appliance being provided with power by the fuel cell system.

One or more filters or purification units (also referred to as filters herein) in can be provided in the hydrogen flow path to remove solid or gaseous byproducts (such as fuel cell poisons) and/or unreacted reactant from the hydrogen. Filters can be located within the fuel units, within the holder and/or at the interface between the hydrogen generator and the rest of the fuel cell system. Filters within the fuel units are replaced when the fuel units are replaced. It may be desirable to provide access for periodically replacing filters located outside the fuel units. Examples of materials that may be suitable for filters include silica, silicon dioxide, silicon nitrides, silicon carbide, silica aerogel, alumina, aluminum oxide, glass, glass wool, mineral wool, cellular glass, microfiber glass (e.g., with a fiber diameter less than 6 μm), perlite and polymers such as polyimides, polyetheretherketone and epoxyamine composites, as well as suitable gas purification units (such as ion exchange resins). It may be possible to select and position filters to also provide thermal insulation.

The hydrogen generator can include a heating system for converting electric energy to thermal energy to initiate a hydrogen-generating thermal decomposition reaction in the fuel unit. Examples of suitable sources of electric energy include one or a combination of a primary battery, a secondary battery, a fuel cell battery, a capacitor and a public utility. The energy source is preferably an external energy source, located outside the hydrogen generator. Circuitry can carry the electric energy to the heating system. The heating system can include one or more heaters located outside the fuel unit, where they can be reused. The heater can include one or more resistive heating elements.

The heater is located outside the packaged fuel unit (e.g., in the cavity or on a surface of the holder housing), in thermal contact with a thermally conductive portion of the fuel unit package, such that heat produced by the heater is conducted through the package to the contents of the fuel unit. For example, the heater or an intermediate thermal conductor can protrude from a surface defining the cavity (e.g., a housing wall, door or projection therefrom) to contact the fuel unit package. To provide good thermal contact, the fuel unit package can fit snugly against the heater or intermediate thermal conductor. The heater or intermediate thermal conductor can be biased against the fuel unit package. For example, this can be accomplished by configuring the heater as a biasing member and/or by placing an intermediate biasing member that is a good thermal conductor between the heater and the fuel unit package. The use of a biasing member can provide good thermal contact between the heater and the fuel unit without impeding insertion or removal of the fuel unit from the cavity and can compensate for expansion or contraction of the fuel unit during use.

As described in further detail below, multiple heaters can be used to provide the capability of selectively heating limited quantities of the total amount of reactant in one or more fuel units. This can be helpful in generating hydrogen gas on an as needed basis and minimizing response times during intermittent use, without creating excessive pressure within the hydrogen generator. For example, individual heaters can be associated with segregated quantities of reactant within a fuel unit, and operation of selected heaters can be controlled to initiate reaction within only the desired quantities of reactant. This can require alignment of the fuel units with individual heaters in the holder.

The hydrogen generator includes one or more fuel units that can be inserted into and removed from a corresponding cavity or cavities in the holder. Each fuel unit contains a single quantity or a plurality of segregated quantities of a reactant composition including one or more reactants that are capable of releasing hydrogen gas when heated to or above a critical temperature at which the desired thermal decomposition of the reactant begins. The reactant mixture is preferably a high density solid mixture, rather than a gas, liquid or gel.

The composition can be in any suitable form, such as powdered, granular or formed into solid bodies such as pellets, pills, tablets, wafers or cakes. The quantities of reactant composition can be sized and shaped to produce a desired amount of hydrogen gas, fit within the fuel unit in a volume efficient manner, facilitate initiation, prevent cross-initiation of adjacent quantities, facilitate release of generated hydrogen, and so on. Quantities of reactant composition can be segregated from one another in various ways such as by containment in individual compartments and/or being spaced apart by gaps, coatings, thermal insulation and the like. For convenience, individual quantities of reactant mixture can be referred to herein as pellets, regardless of the form the composition is in or the size, shape or method of segregation.

The pellets contain at least one hydrogen containing reactant. More than one reactant can be included. Examples of reactants that can evolve hydrogen gas upon thermal decomposition are: lithium imide (LhNH), lithium amide (LiNH2), an ammonium halide (e.g., NH4F, NH4Cl or N2H6Cb) plus a chemical hydride (e.g., LiH, LiBH4, NaBH4, LiAlH4 or NaAlH4), alane (AlH3), ammonia borane (NH3BH3), ammonia borane plus a chemical hydride (e.g., alane or a boron hydrazine complex such as hydrazine bisborane (N2H4(BH3)2)), ammonium nitrate (NH4N03) plus diammonium decaborane (B10H1o(NH4)2), and other materials, such as grapheme and carbon nanotubes with hydrogen inserted therein.

Choices of reactants may be limited by other factors such as physical and chemical properties of the reactant, the type of initiation system being used, the temperature range for the desired thermal decomposition reaction, whether the hydrogen-generating reaction is exothermic or endothermic, the composition, form and properties of reaction byproducts, and so on.

The pellets can also contain one or more additives. Examples of additives include binders (e.g., acrylates and styrene block copolymers), stabilizing compounds (e.g., solid bases), thermally conductive materials (e.g., metals, graphites and combinations and composites thereof), ignition materials as described below, thermally conductive coatings or layers, thermally insulating coatings or layers, molding release agents, and so on. Preferably catalysts are not included in the reactant mixture.

It may be desirable to include an ignition material in the fuel unit, especially if the reactant is endothermic. An ignition material reacts exothermically when heated and can be used in conjunction with the initiation system to provide heat to initiate the hydrogenproducing reaction of the reactant. An ignition material can provide a number of advantages.

The temperature to which the ignition material must be heated to react may be lower than the minimum reaction temperature of the reactant, reducing the heat producing requirement for the initiation system. Because the ignition material reacts exothermically, it can reduce the total amount of energy that must be supplied to the initiator during use of the fuel unit, particularly if the thermal decomposition reaction of the reactant is endothermic. An ignition material can be disposed within or in contact with a pellet. For example, the ignition material can be an ingredient of the reaction mixture, the ignition material can be a separate layer of the pellet from a layer of the reactant mixture, or ignition material can be in a separate pellet in thermal communication with a pellet containing reactant. When an ignition material is separate from the reactant, either as a separate layer or as a separate pellet, portions containing ignition material can be alternated with portions containing reactant. For example, each portion containing reactant can have an adjacent portion of ignition material; a portion containing ignition material can be disposed adjacent to multiple portions containing reactant.

If desired, ignition material can be proximate a surface of the fuel unit to facilitate initiation by a heater. A portion of ignition material can extend away from the point of initiation to facilitate heating reactant in remote portions of the fuel unit. (In some embodiments, both the portion containing reactant and the portion containing ignition material contain reactant and ignition materials, but in different proportions. In these embodiments, a portion containing a higher proportion of reactant is referred to as a portion containing reactant, and a portion containing a higher proportion of ignition material is referred to as a portion containing ignition material.) Some types of ignition materials will also produce hydrogen gas when they react, contributing to the total amount of hydrogen the fuel unit can provide. Examples of ignition materials include iron powder or TiH2 plus KCl04, Mn02 plus LiAlH4, Ni plus Al, Zr plus PbCr04, Fe203 plus Al (thermite), and LiAlH4 plus NH4Cl. It will be understood that references herein to initiating a reaction in a hydrogen-generating reactant includes initiating a heat-generating reaction in an ignition material in embodiments in which the fuel unit includes an ignition material.

Pellets can be arranged in various ways within the fuel unit. For example, the fuel unit can contain a single pellet or multiple pellets. Pellets can be formed in various ways, such as by filling compartments with a powdered or granular mixture, forming solid bodies (e.g., by compressing, molding, extruding, depositing, coating, roll coating, printing, and so on). The pellets can be free-standing bodies, contained in a receptacle or formed on a substrate. Pellets can have a variety of shapes and configurations. If the pellets include powdered or granular material in compartments, the compartments may be covered with a covering layer to retain the material in the desired compartments. The compartments and the covers can be part of the fuel unit package or can be separate components of the fuel unit.

The fuel unit includes a package to contain the reactant composition as well as at least non-gaseous reaction products. The package will have sufficient strength and chemical and thermal stability to withstand shipping, storage and handling prior to use, during use, and during removal and subsequent handling. The package is made from a poor thermal conductor to provide more efficient heating of the reactant therein and has one or more thermal conductor sections for conducting heat from outside the package to the reactant.

The package can include a poor thermal conductor layer and a discontinuous thermal conductor layer. The layers can be layers of a laminate material. The discontinuous thermal conductor layer can include one or more separate thermal conductor sections. The poor thermal conductor layer has one or more apertures therethrough, with each aperture being covered by a thermal conductor section. In this way the poor thermal conductor layer provides thermal insulation between the separate thermal conductor sections. In a preferred embodiment the package has a plurality of apertures and corresponding thermal conductor sections. This allows heat to be conducted through a selected thermal conductor section to initiate the thermal decomposition reaction in a corresponding quantity of reactant composition, while thermally isolating thermal conductor sections to prevent undesired initiation of other quantities of reactant composition. A peripheral area of the thermal conductor section can be bonded to the poor thermal conductor, with either a continuous bond or a discontinuous bond that can provide a gas passage through the package.

The poor thermal conductor preferably has a thermal conductivity less than 5 watts/meter·Kelvin, more preferably less than 2 watts/meter·Kelvin, and most preferably less than 1 watts/meter·Kelvin. Examples of suitable materials include a flexible glass (e.g., Corning Willow Glass from Corning, Inc.) and at least one high temperature polymer having a heat distortion temperature (deflection temperature under load) (as determined according to ASTM D648 at 18.56 kg/cm2 (264 psi)) greater than 250° C. Examples of a high temperature polymer include polyetheretherketone, polyimides, phenolics and derivatives thereof, preferably polyetheretherketone. Various types and grades of PEEK are commercially available. For example, Victrex Manufacturing Limited provides PEEK films ranging in thickness from about 6 μm to about 750 μm and widths of up to 1450 mm. VICTREX® APTN™ PEEK™ 1100 series grades are mineral filled (reinforced), and VICTREX® APTN™ PEEK™ 1000 series grades are not reinforced. The poor thermal conductor can be in the form of a flexible sheet, having an average thickness from about 0.05 mm or greater to about 0.25 mm or less, and preferably about 0.15 mm or less, for example.

Each thermal conductor section preferably has a thermal conductivity greater than 100 watts/meter·Kelvin. Examples of suitable materials include a graphite based material (e.g., GRAFOIL®, made by Graffech) and a metal (e.g., aluminum, steel, stainless steel, copper, a combination or an alloy thereof), preferably aluminum or an aluminum alloy. The thermal conductor sections can be in the form of a flexible sheet, having an average thickness from about 0.025 mm or greater to about 0.25 mm or less. In one example each thermal conductor section has an average thickness of about 0.10 mm or less.

The package can include a container made from a material with poor thermal conductivity and covered with a lid including the poor thermal conductor with one or more thermal conductor sections. The container can have a thermal conductivity less than 5 watts/meter·Kelvin, preferably less than 2 watts/meter·Kelvin, and more preferably less than 1 watts/meter·Kelvin. Examples of suitable materials include a flexible glass (e.g., Corning Willow Glass from Corning, Inc.) and at least one high temperature polymer having a heat distortion temperature (deflection temperature under load) (as determined according to ASTM D648 at 18.56 kg/cm2 (264 psi)) greater than 250° C. Examples of a high temperature polymer include polyetheretherketone, polyimides, phenolics and derivatives thereof, preferably polyetheretherketone. The poor thermal conductor can have an average thickness from about 0.05 mm or greater to about 0.25 mm or less. In one example the poor thermal conductor can have an average thickness of about 0.10 mm or greater. In another example the poor thermal conductor can have an average thickness of about 0.15 mm or less. The lid can be secured to the container with an adhesive and/or by using one or more of ultrasonics, lasers induction, heater bars, and infrared heaters.

Alternatively, peripheral portions of one or more sections of the poor thermal conductor with one or more thermal conductor sections can be sealed together to form a pouch or other shape for enclosing the reactant composition.

In one embodiment the poor thermal conductor with one or more thermal conductor sections can be in the form of package strip made from a substrate strip (a poor thermal conductor layer) and a conductor strip (a thermal conductor layer). The substrate strip can be a flexible substrate (e.g., to allow feeding of the substrate strip from a roll), or a more rigid material may be desired (e.g., to provide greater strength or to facilitate feeding of shorter lengths of substrate strip in sections, such as from a stack or a magazine). An array of apertures can be formed in the substrate strip, and an array of conductor sections can be formed in the conductor strip. The substrate strip and the conductor strip can be aligned such that conductor sections in the conductor strip are aligned with apertures in the substrate strip.

With the conductor sections aligned with corresponding apertures, peripheral portions of the conductor sections can be bonded to portions of the substrate strip surrounding the corresponding apertures so each of the apertures is covered by a corresponding conductor section, thereby forming a bonded strip. One or a plurality of apertures can be covered by a single conductor section. The bonds can be continuous or discontinuous bonds around the peripheral portions of the conductor sections. Packages can be formed using one or more package strip segments. A peripheral portion of a package strip segment can be secured to itself, to another package strip segment, to another package component, or a combination thereof. For example, a package can be an envelope or pouch, formed from one or several package strip segments. A single segment can be folded to form one edge of the package, and/or peripheral edges are secured or sealed to form package seams. The contents of the fuel unit (e.g., reactant composition, heating elements, thermal insulation, and the like) can be positioned before the envelope or pouch is formed or before securing or sealing the last seam.

In another example, a package strip segment can be used to close or seal another package component after the contents have been inserted to form the package. Various processes can be used to secure a package strip component, such as heat sealing, adhesive bonding, ultrasonic welding, laser welding and pressure lamination. A package strip segment can be secured with a continuous or a discontinuous bond. This embodiment is disclosed in further detail in commonly owned U.S. Provisional Patent Application No. 61/657,909, filed on Jun. 11, 2012.

Hydrogen gas generated within the fuel unit must be able to pass from the fuel unit. This can be accomplished in various ways, including through one or a combination of a discontinuous bond between thermal conductor sections and the poor thermal conductor, a separate opening in the package, a valve, and the like.

It may be desirable to include thermal insulation near or as part of the package to protect the user when a used fuel unit is removed from the hydrogen generator. Though the package itself includes a poor thermal conductor, additional thermal insulation can be provided external or internal to the package. Examples of materials that may be suitable as thermal insulation include silica, silicon dioxide, silicon nitrides, silicon carbide, silica aerogel, alumina, aluminum oxide, glass, glass wool, mineral wool, cellular glass, perlite, and polymers such as polyimides and epoxy-amine composites.

The hydrogen generator can include means for preventing removal of a hot fuel unit from the hydrogen generator. For example, temperature can be monitored with a sensor, and an interlock (e.g., a latching mechanism that can be maintained in a latched position) can be used to prevent opening a door to remove the fuel unit before it cools sufficiently, such as to or below a predetermined maximum temperature of 50° C.

In order to provide hydrogen gas on an as-needed basis without developing a high internal pressure within the hydrogen generator, it is advantageous for the hydrogen generator to include multiple fuel units, each of which that can be used selectively, and/or for the fuel unit(s) to contain multiple pellets in which the hydrogen-generating reaction can be individually initiated on a selective basis. This can be accomplished by using a control system in conjunction with the initiation system, the initiation system including multiple heaters that can be aligned with individual fuel units and/or individual pellets or groups of pellets in the fuel unit(s). If the fuel unit includes only a single pellet, more than one fuel unit must be used for this purpose. If the fuel unit includes more than one pellet, one or more fuel units can be used. The heaters can be aligned with individual pellets or groups of pellets, as described in further detail below.

The control system controls the supply of energy from a source to the initiation system. The control system can determine the need for hydrogen and/or the required hydrogen flow rate by monitoring the pressure within the fuel cell system, one or more electrical characteristics of the fuel cell stack, or one or more electrical characteristics of the electronic device, for example. The controller may communicate with the device or the fuel cell stack to determine when more hydrogen is needed. The control system can be completely or partially disposed in the hydrogen generator, the fuel cell stack, the electronic device being powered by the fuel cell stack, or any combination thereof. The control system can include a microprocessor or micro controller; digital, analog and/or hybrid circuitry; solid state and/or electromechanical switching devices; capacitors, sensing instrumentation, timers, DC-DC converters, and so on. The same or a different control system can also be used for other purposes, such as identifying hydrogen generators and fuel units that are appropriate or approved for use, preventing use of inappropriate or unapproved hydrogen generators and fuel units, controlling charging of batteries in the fuel cell system and the device by the fuel cell battery, calculating and providing information on the remaining capacity of the fuel unit(s), recording historical information regarding the use of fuel units, the hydrogen generator, the fuel cell system and the device, preventing operation of the hydrogen generator under unsafe conditions, and other purposes.

It may be desirable to determine the quantity or relative amount of reactant remaining in a fuel unit or the quantity or relative amount of hydrogen that can still be generated by a fuel unit. The fuel unit can include a fuel gauging feature for determining one or a combination of hydrogen gas produced, hydrogen gas remaining, reactant consumed, reactant remaining, number of segregated quantities of fuel used or number of segregated quantities of fuel remaining. The fuel gauging feature can include one or more of a temperature sensor, a temperature indicator, and a memory device. The fuel gauging feature can be part of a fuel gauging system. All or a portion of the fuel gauging system can be disposed outside the package fuel unit (i.e., in the holder or fuel cell system).

An embodiment of a fuel unit is shown in FIG. 1 [AF-012], in which two fuel units 10 are shown facing each other. The lower fuel unit 10 is shown in an assembled condition, and the upper fuel unit 10 is show in an exploded view. Each fuel unit 10 includes a container 12 and a lid 14 covering the open side of the container 12. The lid 14 including a poor thermal conductor 16 and several thermal conductor sections 18, each covering an aperture in the thermal conductor 16. The poor thermal conductor 16 is a poor thermal conductor layer, and the thermal conductor sections 18 are a thermal conductor layer. Each container 10 has filter assembly 20 including a filter covering an array of holes 22 that serve as the primary hydrogen gas outlet. The fuel units 10 can be separated by one or more spacers 24. Optionally, each fuel unit 10 can include external thermal insulation around the container 12; this insulation can be made from a porous material (e.g., cardboard or paperboard) that will allow hydrogen gas to readily pass therethrough. Within the fuel units 10 are several pellets 26 of a reactant composition containing a reactant. Pairs of pellets 26 are separated from each other by internal thermal insulators 28.

In an example of the above embodiment of fuel units 10, the containers 10 are made from 0.13 mm thick PEEK, the poor thermal conductor layers 16 are 0.13 mm thick PEEK, the thermal conductor layers 18 are 0.05 mm thick aluminum foil, the filter is 0.42 mm thick, 0.7 μm microfiberglass, the spacer 24 is made from 1.0 mm thick PEEK, the filter assembly 20 is secured to the container 12 with a silicone adhesive, the lid 14 is secured to the container 12 with a thermal bond, each of the 6 pellets 26 weighs approximately 4.58 g, the reactant composition includes about 90 weight percent alane and 10 weight percent PTFE binder, and the internal insulators 28 are 0.4 mm thick mica. In this example, a pair of fuel units 10 would weigh approximately 64 g and could generate approximately 4.7 g (57 L at 25° C.) of hydrogen gas.

Figure 2:
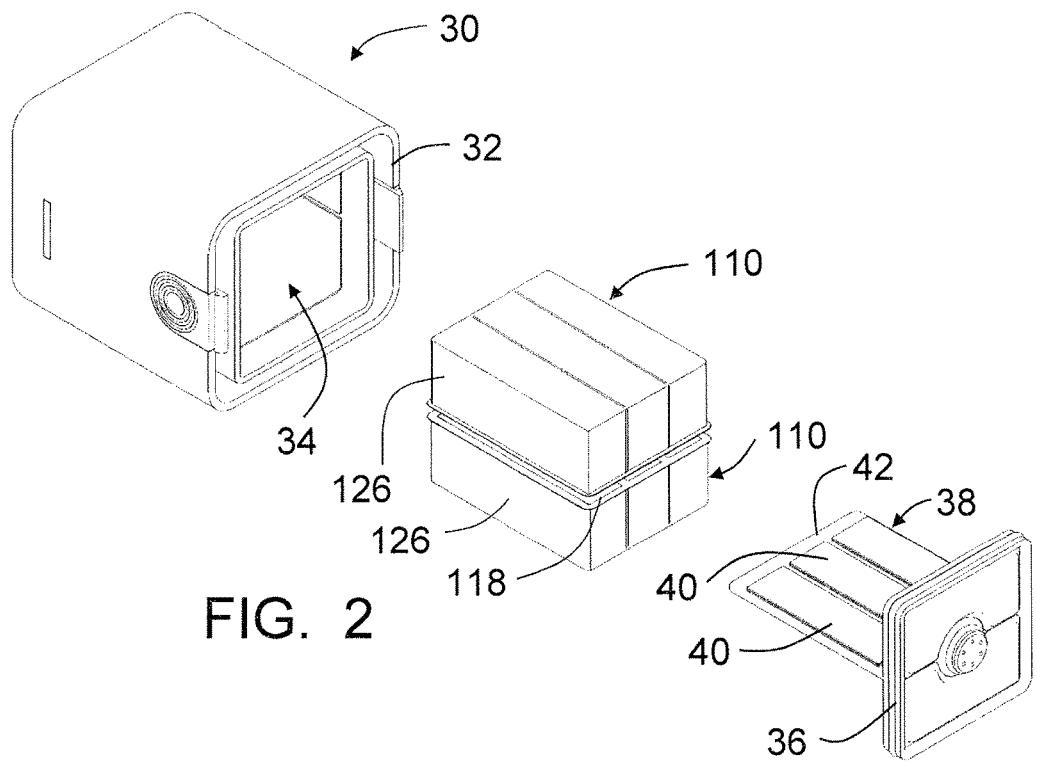
FIG. 2 is an exploded perspective view of a first embodiment of a hydrogen generator.

An embodiment of a hydrogen generator in which fuel units can be used to generate hydrogen is shown in FIG. 2. The hydrogen generator 30 includes a holder having a housing 32 with a cavity 34 into which packaged fuel units 110 can be inserted. The fuel units 110 can be similar to fuel units 10 described above, without a spacer separating the fuel units 110. The hydrogen generator 30 includes a door 36 for closing and sealing the housing 32 with the fuel units 110 inside. Two rectangular fuel units 110, each containing segregated quantities (pellets) 126 of reactant composition, are shown, but fewer or more fuel units with the same or different shapes and the same or a different number of pellets can be used. The hydrogen generator 30 further includes a heater assembly 38 with individual heating elements 40. The heater assembly 38 can be on or attached to the door 36, such as by support member 42 extending from the door as shown in FIG. 2, so the heating elements 40 will make contact with corresponding thermal conductor sections 118 when the fuel units 110 are inserted in the cavity 34. Alternatively, the heater assembly 38 can be on or attached to the housing 32. By centrally locating the heater assembly 38, the fuel units 110 are substantially heated from the inside out, and parasitic heat losses are minimized.

Figure 3:
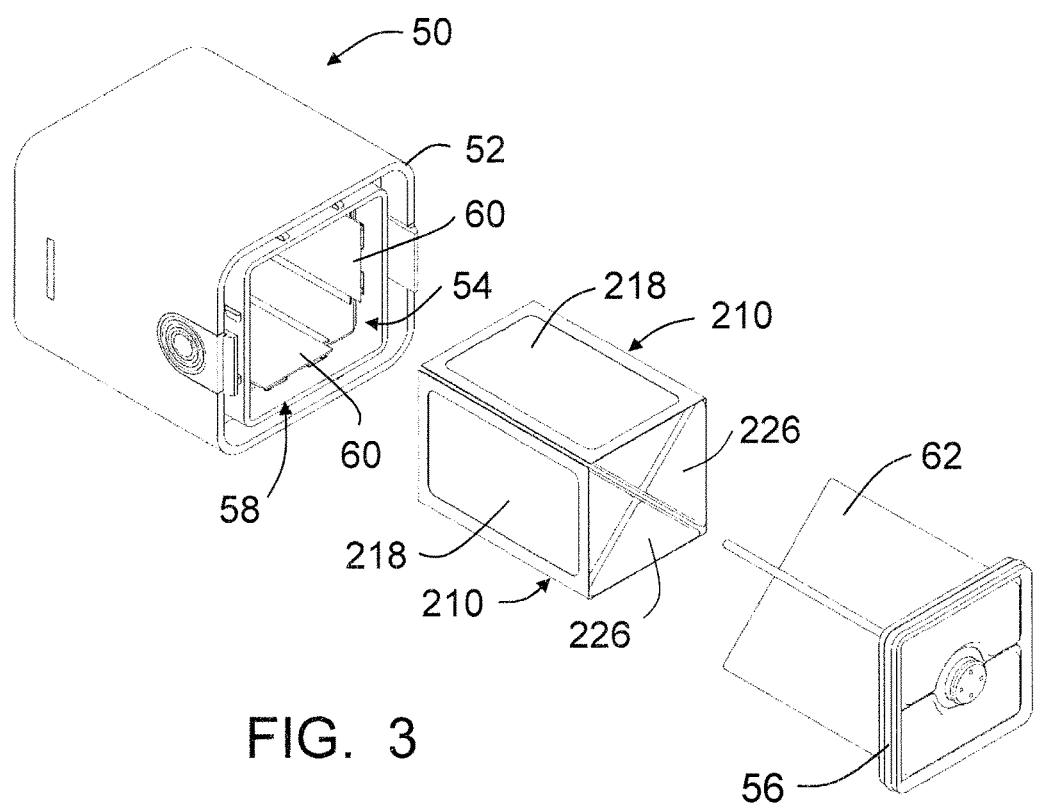
FIG. 3 is an exploded perspective view of a second embodiment of a hydrogen generator.

Another embodiment of a hydrogen generator is shown in FIG. 3. Hydrogen generator 50 includes a housing 52, with a cavity 54 into which packaged fuel units 210 can be inserted. The fuel units 210 are similar to fuel units 10 and 110 described above. Four triangular fuel units 210, each containing a single pellet 226 of reactant composition, are shown, but fewer or more fuel units with the same or different shapes and the same or a different number of pellets can be used. The hydrogen generator 50 includes a door 56 for closing and sealing the housing 52 with the fuel units 210 inside. The hydrogen generator 50 includes a heater assembly 58 with heating elements 60. The heater assembly 58 can be on or attached to the door 56 as shown in FIG. 2, or the heater assembly can be on or attached to the housing 52, as shown in FIG. 3, so the heating elements 60 will make contact with corresponding conductor sections 218 when the fuel units 210 are inserted in the cavity 54.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A hydrogen generator comprising:
    a base having a cavity therein;
    a plurality of replaceable segregated fuel units placed in the cavity, each comprising a single or a plurality of reactant pellets, each reactant pellet comprising a reactant that can undergo thermal decomposition to produce hydrogen gas when heated to at least a minimum initiation temperature;
    a plurality of compartments, each containing at least one of the plurality of replaceable, segregated fuel units, each compartment comprising a covering layer that retains the reactant in the compartment;
    at least one hydrogen outlet through which hydrogen gas can escape;
    at least one replaceable hydrogen purification unit located upstream of the hydrogen outlet;
    a lid comprising:
        a layer of material with a poor thermal conductivity of less than 5 watts/meter·Kelvin, the layer having a plurality of apertures therethrough, and
        a plurality of separate thermal conductor sections, wherein the layer of material with a poor thermal conductivity is configured to provide thermal insulation between the separate thermal conductor sections,
    wherein each thermal conductor section is in contact with at least one of the plurality of replaceable, segregated fuel units;
    wherein the apertures are covered by the plurality of thermal conductor sections, with each of the thermal conductor sections bonded to the corresponding aperture with a bond around the peripheral portion of the thermal conductor section; and
    wherein the cavity is covered by the lid; and
    a heating system comprising a plurality of heaters, each heater in thermal communication with at least one of the plurality of thermal conductor sections.

2. The hydrogen generator of claim 1, wherein the hydrogen purification unit comprises at least one of silica, silicon dioxide, a silicon nitride, silicon carbide, silica aerogel, alumina, aluminum oxide, glass, glass wool, mineral wool, cellular glass, microfiber glass, perlite or a polymer.

3. The hydrogen generator of claim 2, wherein the polymer is a polyimide, polyetheretherketone, or epoxy-amine composite.

4. The hydrogen generator of claim 1, wherein the plurality of replaceable, segregated fuel units further comprises an exothermic ignition material to provide heat to initiate the hydrogen-producing reaction of the reactant.

5. The hydrogen generator of claim 4, wherein the ignition material is disposed proximate to the surface of the plurality of replaceable, segregated fuel units.

6. The hydrogen generator of claim 4, wherein the ignition material comprises at least one of $TiH_2$ plus $KClO_4$, $MnO_2$ plus $LiAlH_4$, Ni plus Al, Zr plus $PbCrO_4$, $Fe_2O_3$ plus Al (thermite), or $LiAlH_4$ plus $NH_4Cl$.

7. The hydrogen generator of claim 1, wherein the plurality of replaceable, segregated fuel units comprises a single reactant pellet.

8. The hydrogen generator of claim 1, wherein the plurality of replaceable, segregated fuel units comprises a plurality of reactant pellets.

9. The hydrogen generator of claim 8, wherein porous thermal insulation is disposed between adjacent pellets.

10. The hydrogen generator of claim 1 further comprising a fuel gauge element to determine at least one of the amount of hydrogen gas produced, the amount of hydrogen gas remaining, the amount of reactant consumed, the amount of reactant remaining, the number of segregated quantities of fuel, or the number of segregated quantities of fuel remaining.

11. The hydrogen generator of claim 1, wherein the bond around the peripheral portion of each of the thermal conductor sections is continuous.

12. The hydrogen generator of claim 1, wherein the bond around the peripheral portion of each of the thermal conductor sections is discontinuous.

* * * * *